US010927660B2

(12) United States Patent
Jaaskelainen et al.

(10) Patent No.: US 10,927,660 B2
(45) Date of Patent: Feb. 23, 2021

(54) TILTMETER FOR EAT APPLICATIONS

(71) Applicant: Halliburton Energy Services, Inc., Houston, TX (US)

(72) Inventors: Mikko Jaaskelainen, Katy, TX (US); Brian Vandellyn Park, Spring, TX (US); Nicholas Clive Spencer Wheeler, Spring, TX (US); Eric James Davis, El Cerrito, CA (US); Norman Raymond Warpinski, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 102 days.

(21) Appl. No.: 16/311,538

(22) PCT Filed: Sep. 8, 2016

(86) PCT No.: PCT/US2016/050829
§ 371 (c)(1),
(2) Date: Dec. 19, 2018

(87) PCT Pub. No.: WO2018/048412
PCT Pub. Date: Mar. 15, 2018

(65) Prior Publication Data
US 2019/0234198 A1 Aug. 1, 2019

(51) Int. Cl.
*E21B 47/02* (2006.01)
*E21B 47/0224* (2012.01)
*G01B 11/16* (2006.01)
*G01V 1/22* (2006.01)
*E21B 47/01* (2012.01)
*G01V 1/52* (2006.01)

(52) U.S. Cl.
CPC .......... *E21B 47/0224* (2020.05); *E21B 47/01* (2013.01); *E21B 47/02* (2013.01); *G01B 11/16* (2013.01); *G01V 1/226* (2013.01); *G01V 1/52* (2013.01); *G01V 2001/526* (2013.01)

(58) Field of Classification Search
CPC ...... E21B 47/01; E21B 47/02; E21B 47/0224; G01B 11/16; G01V 1/226; G01V 1/52; G01V 2001/526
See application file for complete search history.

(56) References Cited

U.S. PATENT DOCUMENTS 5,934,373 A 8/1999 Warpinski et al.
6,128,250 A * 10/2000 Reid .................... B06B 1/0633
367/153

(Continued)

FOREIGN PATENT DOCUMENTS

WO 2015020642 A1 2/2015
WO 2018048412 A1 3/2018

*Primary Examiner* — Francis C Gray
(74) *Attorney, Agent, or Firm* — John W. Wustenberg; Parker Justiss, P.C.

(57) ABSTRACT

An electro acoustic technology (EAT) based micro seismic sensor and tiltmeter system and method is described for the measurement of minute deformations in downhole formations caused by hydraulic fracturing or other sources of pore pressure changes. A number of sensor arrays are described that are installed in clamp-on EAT devices installed in tool wells located in close proximity to hydraulically fractured wells.

24 Claims, 9 Drawing Sheets

(56) References Cited

U.S. PATENT DOCUMENTS

| | | | |
|---|---|---|---|
| 6,462,672 B1* | 10/2002 | Besson | E21B 47/00 |
| | | | 340/853.2 |
| 7,028,772 B2 | 4/2006 | Wright et al. | |
| 9,631,485 B2* | 4/2017 | Keller | E21B 17/1078 |
| 2006/0081412 A1* | 4/2006 | Wright | E21B 43/26 |
| | | | 181/104 |
| 2006/0219402 A1 | 10/2006 | Lecampion | |
| 2013/0025852 A1 | 1/2013 | Edmonstone et al. | |
| 2014/0022537 A1 | 1/2014 | Samson et al. | |
| 2016/0003648 A1* | 1/2016 | Barfoot | E21B 47/135 |
| | | | 250/227.19 |
| 2017/0167249 A1* | 6/2017 | Lee | E21B 47/135 |
| 2018/0058202 A1* | 3/2018 | Disko | E21B 47/017 |
| 2018/0306937 A1* | 10/2018 | Bagaini | G01V 1/282 |

\* cited by examiner

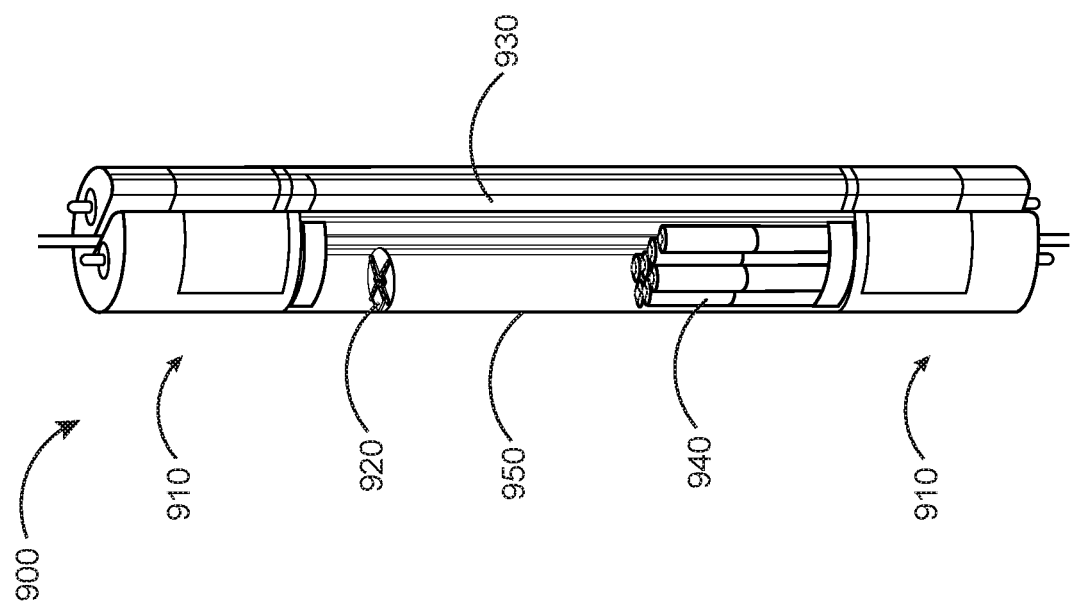

TILTMETER FOR EAT APPLICATIONS

CROSS-REFERENCE TO RELATED APPLICATION

This application is the National Stage of, and therefore claims the benefit of, International Application No. PCT/US2016/050829 filed on Sep. 8, 2016, entitled "TILTMETER FOR EAT APPLICATIONS," which was published in English under International Publication Number WO 2018/048412 on Mar. 15, 2018. The above application is commonly assigned with this National Stage application and is incorporated herein by reference in its entirety.

BACKGROUND

Tiltmeters are used in oil and gas wells to detect minute deformations in the formation caused by hydraulic fracturing or other sources of pore pressure changes. The data can be used to identify where and how injected fluids have been placed within the reservoir, fracture detection and characterization, and other information.

Hydraulic fracturing is a worldwide multi-billion dollar industry, and is often used to increase the production of oil or gas from a well. The subsurface injection of pressurized fluid results in a deformation to the subsurface strata. This deformation may be in the form of one or more large planar partings of the rock, in the case of hydraulic fracture stimulation, or other processes where injection is above formation parting pressure. The resultant deformation may also result from cases where no fracturing is occurring, wherein the subsurface strata (rock layers) compact or swell due to the poroelastic effects from altering the fluid pressure within the various rock layers.

A variety of applications can induce pore pressure changes, fluids are injected into the earth, such as for hydraulic fracture stimulation, waste injection, produced water re-injection, or for enhanced oil recovery processes like water flooding, steam flooding, or $CO_2$ flooding. In other applications, fluids are produced, i.e. removed, from the earth, such as for oil and gas production, geothermal steam production, or for waste clean-up.

The preparation of a new well for hydraulic fracturing typically comprises the steps of drilling a well, cementing a casing into the well to seal the well from the rock, and creating perforations at a desired target interval. Perforations are small holes through the casing, which are formed with an explosive device. The target interval is the desired depth within the well, which typically is at the level of a pay zone of oil and/or gas. A bridge plug is then commonly inserted below the perforated interval, to seal off the lower region of the well.

Hydraulic fracturing within a prepared well bore comprises the pumping of fluid, under high pressure, down the well. The only place that the fluid can escape is through the formed perforations, and into the target zone. The pressure created by the fluid is greater than the in situ stress on the rock, so fractures (cracks, fissures) are created. Proppant (usually sand) is then pumped into the prepared well, so that when the fluid leaks off into the rock (via natural porosity), the proppant creates a conductive path for the oil/gas to flow into the well bore. Creation of a hydraulic fracture, therefore, involves parting of the rock, and displacing the fracture faces, to create fracture width. The induced deformation field resulting from the hydraulic fracturing radiates in all directions.

Surface and offset well tiltmeter fracture mapping have been used to estimate and model the geometry of formed hydraulic fractures, by measuring fracture-induced rock deformation.

There is a need though for better and lower cost approaches for gathering the needed data for this application. The approach to be described herein consists of a MEMS inclinometer array with wide range and sensitivity, coupled with downhole micro seismic receivers, all conveyed on a fiber optic wireline. These can be used in both horizontal and vertical sections of the well, by using clamp on EAT technology and DAS telemetry.

BRIEF DESCRIPTION OF THE DRAWINGS

Elements in the figures have not necessarily been drawn to scale in order to enhance their clarity and improve understanding of these various elements and embodiments of the application. Furthermore, elements that are known to be common and well understood to those in the industry are not depicted in order to provide a clear view of the various embodiments of the application, thus the drawings are generalized in form in the interest of clarity and conciseness.

FIG. 9 illustrates a vertical EAT tiltmeter assembly.

DETAILED DESCRIPTION

Figure 1:
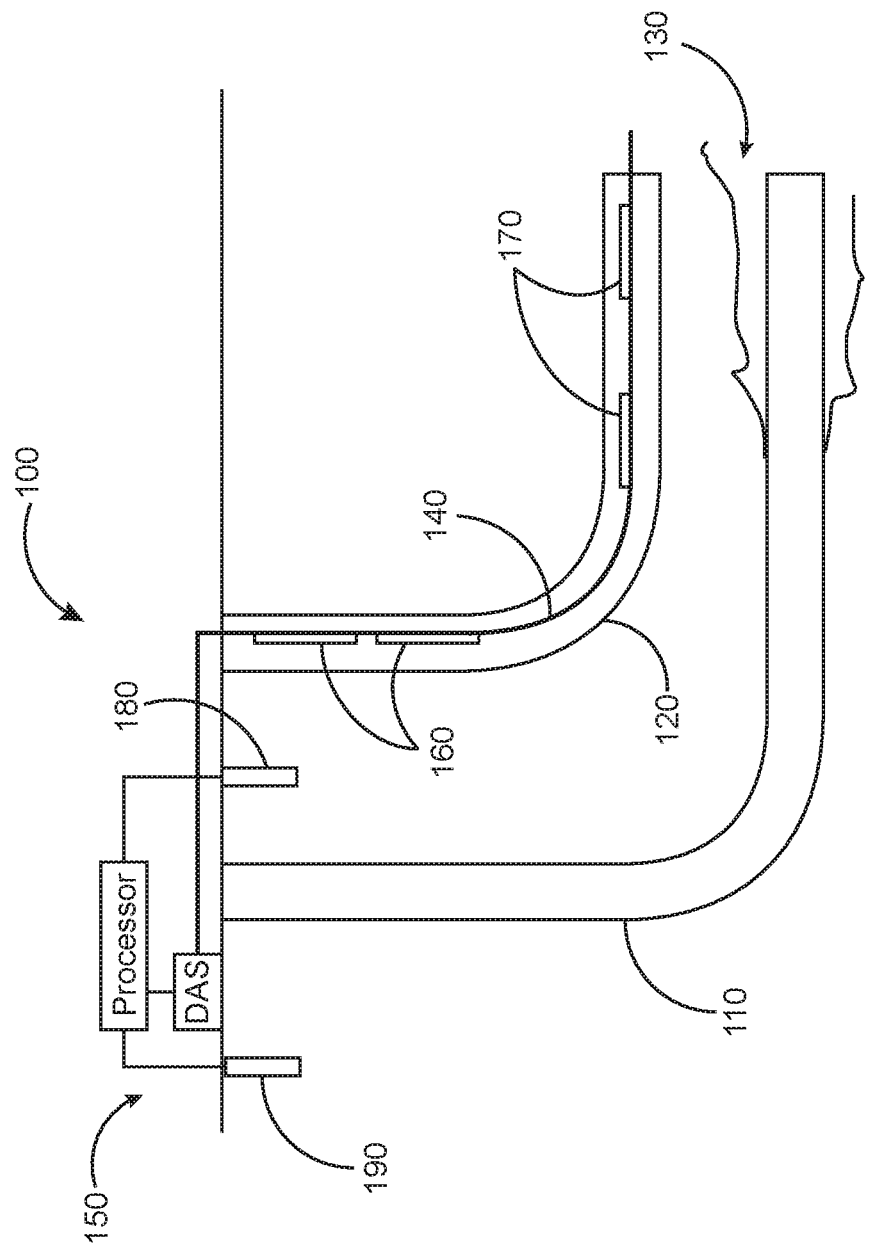
FIG. 1 illustrates a tiltmeter EAT system

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of sensors, electronic or fiber optic based, can be utilized to make the basic parameter measurements, but all of the resulting information is converted at the measurement location into perturbations or a strain applied to an optical fiber that is connected to an interrogator. The interrogator may routinely fire optical signal pulses into the optical fiber. As the pulses travel down the optical fiber back scattered light is generated and is received by the interrogator.

The perturbations or strains introduced to the optical fiber at the location of the various EAT sensors can alter the back propagation of light and those affected light propagations can then provide data with respect to the signal that generated the perturbations.

The possible advantages from using the above described EAT systems in a variety of configurations may include using a variety of sensors, either electrical or fiber optic based, to measure for example a micro seismic event, a chemical concentration, a pH, a temperature, or a pressure and using a common optical fiber connected to a interrogator to measure perturbation signals from each EAT sensor assembly location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

A typical system is shown in FIG. 1, shown generally as 100. A fractured well 110, which creates a fracturing zone 130 is being monitored from a tool well 120 in close proximity. A wireline, containing optical fiber 140, has been lowered into the tool well and tractored in to the bottom of the well. The fiber is used as a sensor to detect acoustic signals along the entire length of the fiber. An interrogator 150 at the surface decodes the signals to provide useful information. This is called Distributed Acoustic Sensing (DAS). While the wireline is being lowered into the well, clamp on EAT devices 160, 170 are attached at required intervals. These devices contain orthogonal arrays of inclinometers, micro seismic sensors, and perhaps other sensors, signal processing, batteries and transmission transducers. Once the cable is deployed, the EAT tiltmeters and accompanying micro seismic sensors are located in the well at desired locations either in the horizontal or vertical section of the well. Tilt information is detected by the tiltmeters in the EAT tool, processed by the signal processor and converted to acoustic signals. The signals are detected by the optical fiber and thus transmitted to the surface where the DAS interrogator decodes the signals and provides tilt information to a processor for analysis. Surface tiltmeters 180, 190 may also be used to collect information.

The same optical fiber is used for telemetry of micro seismic information back to the surface. Low cost electronics within the EAT sensor system are then used to convert the sensor signal to a frequency, and the frequency is converted to an acoustic frequency signal. Multiple frequencies could be used to differentiate between X/Y/Z components in a 3D sensor package, as well as different data from micro seismic sensors. The EAT transmission frequencies could be selected to be outside the seismic signal range of interest. The typical seismic range of interest for reflection seismic is in the 0-250 Hz range and 0-2,000 Hz for micro-seismic applications.

The combination of the tiltmeter meter data and the micro seismic data provides excellent insight on actual formation deformation, resulting in improved accuracy in determining fracture characteristics. These characteristics may include depth coverage, number of fractures, orientation, and other features of interest.

The processor combines the downhole and surface tiltmeter information as well as the micro seismic sensor data to create fracture maps of the well and other information for increasing reservoir productivity and reducing completion costs.

Figure 2:
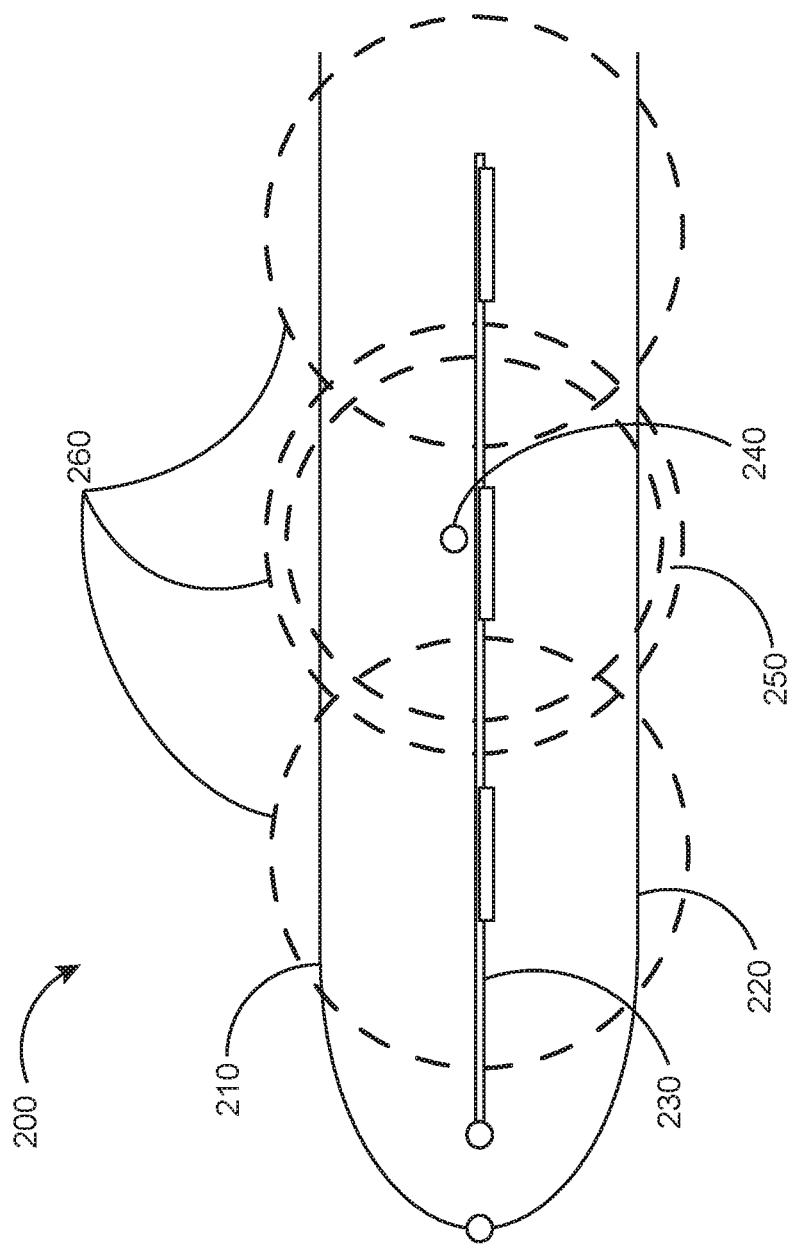
FIG. 2 illustrates a Plan view of two fractured wells with horizontal and vertical tool wells.

FIG. 2, shown generally as 200, illustrates the advantage of horizontal tiltmeter EATs. A plan view of multiple fractured horizontal wells 210, 220, is shown with a single horizontal tool well 230. A vertical tool well 240 is also shown. The vertical tool well shows a limited area of sensitivity 250 that diminishes vertically away from the fracture wells, while the horizontal tool well shows a much larger area of sensitivity 260 much closer to the fractured wells.

Universal Tiltmeter

The magnitudes of the deformations are very small and require highly sensitive instruments. Typical tilts are of the order of 100 nanoradians (100 parts in a billion) at the observation well, and so highly sensitive tiltmeters are required. Traditionally sensors based on the same principal as the carpenter's level have been used—a bubble in a fluid inside a bent glass tube. While these are extremely sensitive, their trade-off is that their range is very limited, typically to half a degree or less, and once out of range, they must be physically reoriented back into the operating range. This requires a motorized system that pivots the sensor to the center of its operating range. However, even this mechanism may be limited, and unable to cope with large deviations such as horizontal wells. As a result, tiltmeters have not to date been used commercially in horizontal sections of the well. Having tiltmeters in the horizontal sections of the well should provide much larger and stronger signals compared to the surface tiltmeters, which will improve the accuracy of the fracture mapping.

Figure 3:
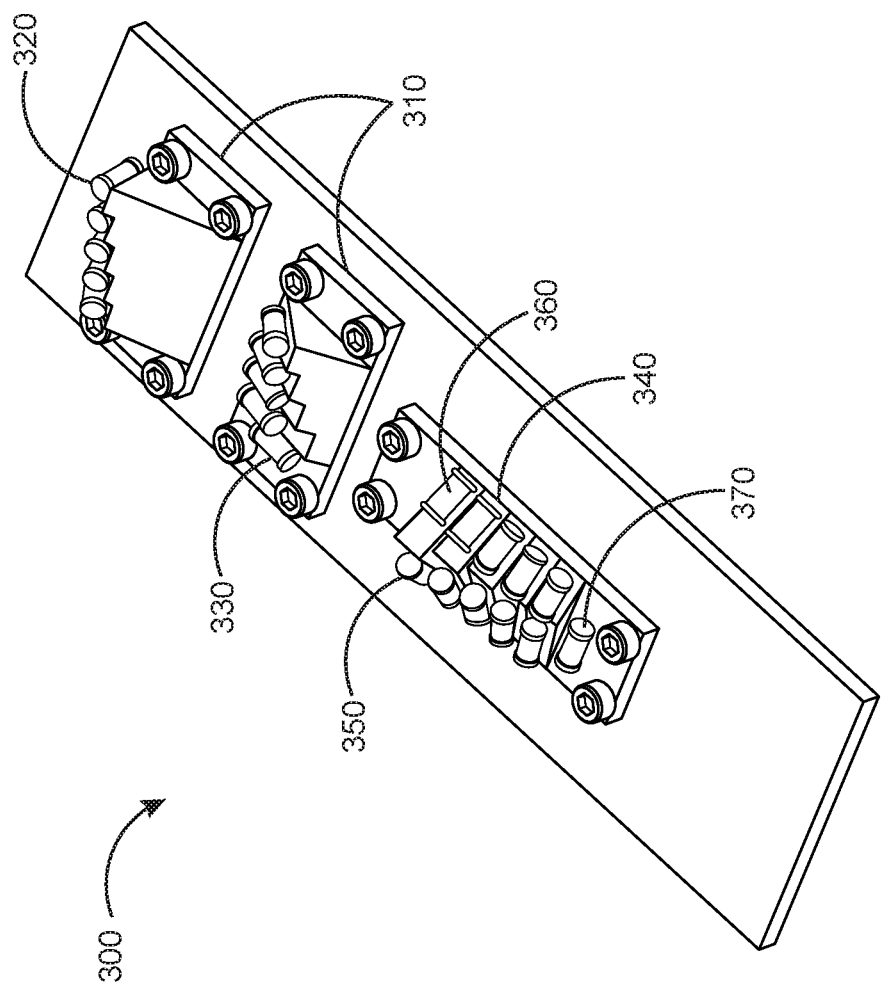
FIG. 3 illustrates universal tiltmeter arrays.

FIG. 3, shown generally as 300, illustrates an array of MEMS (micro electro mechanical systems) tiltmeters mounted on a circuit board. MEMS sensors are extremely small, rugged, low power devices. Commercial versions have a range of +/−15 degrees and a resolution of 2 arc seconds. Versions for this application would be designed with a narrower range and much higher resolution approaching the glass versions. Because they are small, many can be fitted on a long narrow circuit board. Not shown in these figures are the accompanying micro seismic sensors, which could be mounted on the same boards. And the data from both types of sensors can be conveyed to the surface (at different frequencies) via DAS telemetry using the EAT technology.

Two lateral arrays 310 are shown. The first lateral sensor 320 is mounted perpendicular to the board for vertical sections of the well. Each subsequent sensor is mounted at the angle of the previous one minus the range of the sensor. For example if the range is +/−5 degrees, then the second sensor is mounted at 10 degrees to the first, the third is mounted 10 degrees to the second, and so on, until 90 degrees 330 is reached, suitable for horizontal wells. Thus 10 sensors would cover the full 90 degrees. If the range needs to be +/−1 degree to get the required sensitivity, then 45 sensors can be used. So whatever the lateral angle, there is a sensor in its sweet spot.

Similarly an axial array 340 for measuring tilt along the axis of the tool is provided. In this case two rows of tiltmeters provide up to +/−50 degrees of range.

Figure 4:
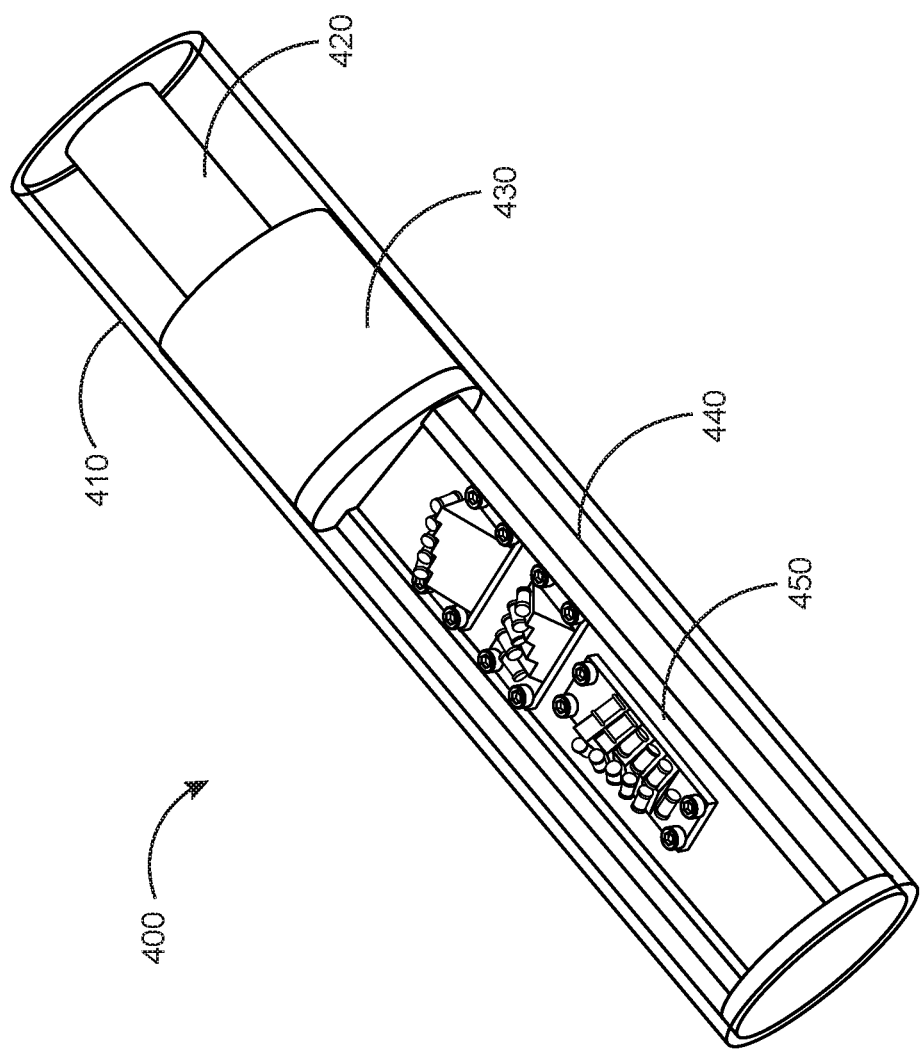
FIG. 4 illustrates a universal tiltmeter subassembly.

For horizontal locations in the well, the circuit board is mounted in a rotatable cylinder along its long axis—see FIG. 4, shown generally as 400. A high gear ratio gearbox 430 such as a planetary gearbox with a small stepper or servo motor 420 is used to rotate the rotating PCB frame board 440 at the beginning of the run to ensure that the board is 'upright'. A horizontal MEMS tilt sensor is used to find the position. Alternatively a lower resolution tiltmeter chip (not shown) can be used to find the 'upright' position more quickly and then switch to the tiltmeter array for more accurate measurements, or the motor could use only the tiltmeter sensors on board to determine when the sensors are in the ideal position. Once 'zero' is found, the board is not rotated again, and the tilt sensor array measures the angle changes induced by formation movement.

EAT Technology

Figure 5:
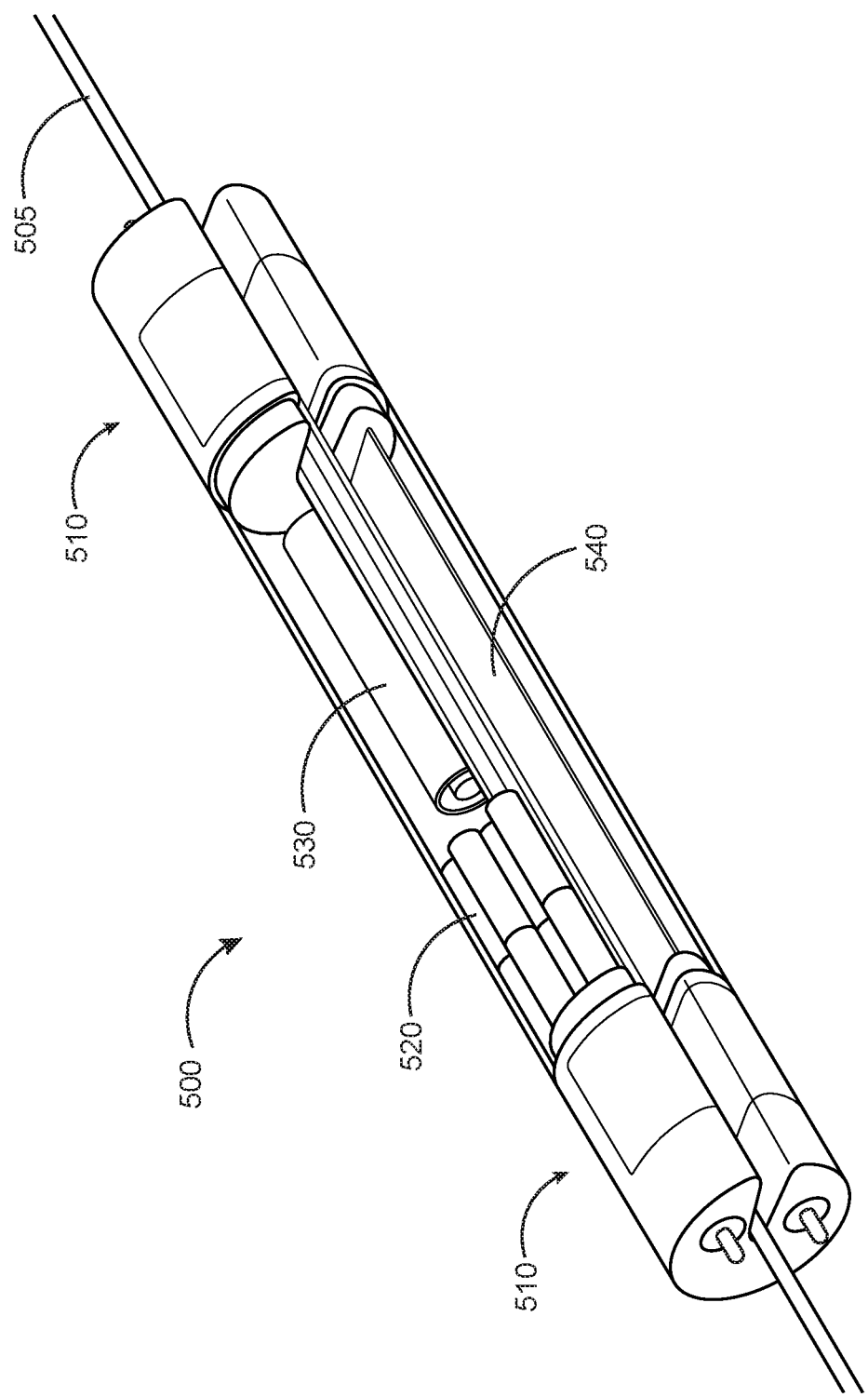
FIG. 5 illustrates a universal tiltmeter assembly.

As previously described in the discussion of FIG. 1, as the wireline is lowered into the well the clamp on EAT devices 160 and 170 shown in FIG. 1 are added and can now be illustrated in more detail in FIG. 5, shown generally as 500. The clamp on EAT device, with a v-shaped groove running its length is place over the wireline cable 505 and cable clamps 510 on each end clamp down on the cable with internal grippers consisting of eccentric circular cams that lock onto the wireline cable. The rotating subassembly 530 of FIG. 4 is mounted within the EAT housing, as are the batteries 520 and signal processing board 540.

Horizontal EAT Tiltmeter Assembly

In some cases the EAT tiltmeter instrument may be designed to operate only in a near horizontal orientation. In this case a simpler tiltmeter assembly can be employed. This is shown generally as 600 in FIG. 6. A MEMS based accelerometer/tiltmeter 640 is mounted on a signal conditioning PCB board with a Y-axis MIMS tilt sensor array 620 and an X-axis MEMS tilt sensor array 630. Not shown in these figures are the accompanying micro seismic sensors, which could be mounted on the same boards.

In this version two arrays of tiltmeters perpendicular to each other are mounted on a small signal conditioning board. In addition, a MEMS tiltmeter/accelerometer chip is also included, although with lower sensitivity than the array tiltmeters. Each successive array tiltmeter is mounted at a different angle from the previous one, so that a wide overall range is covered by the array. Each tiltmeter in the array has a narrow range but high sensitivity to angular change. Since the sensor array is designed specifically for horizontal wells, its range can be much smaller than the universal array described previously, and fewer MEMS tiltmeters are required, thus simplifying the device and reducing cost.

Figure 6:
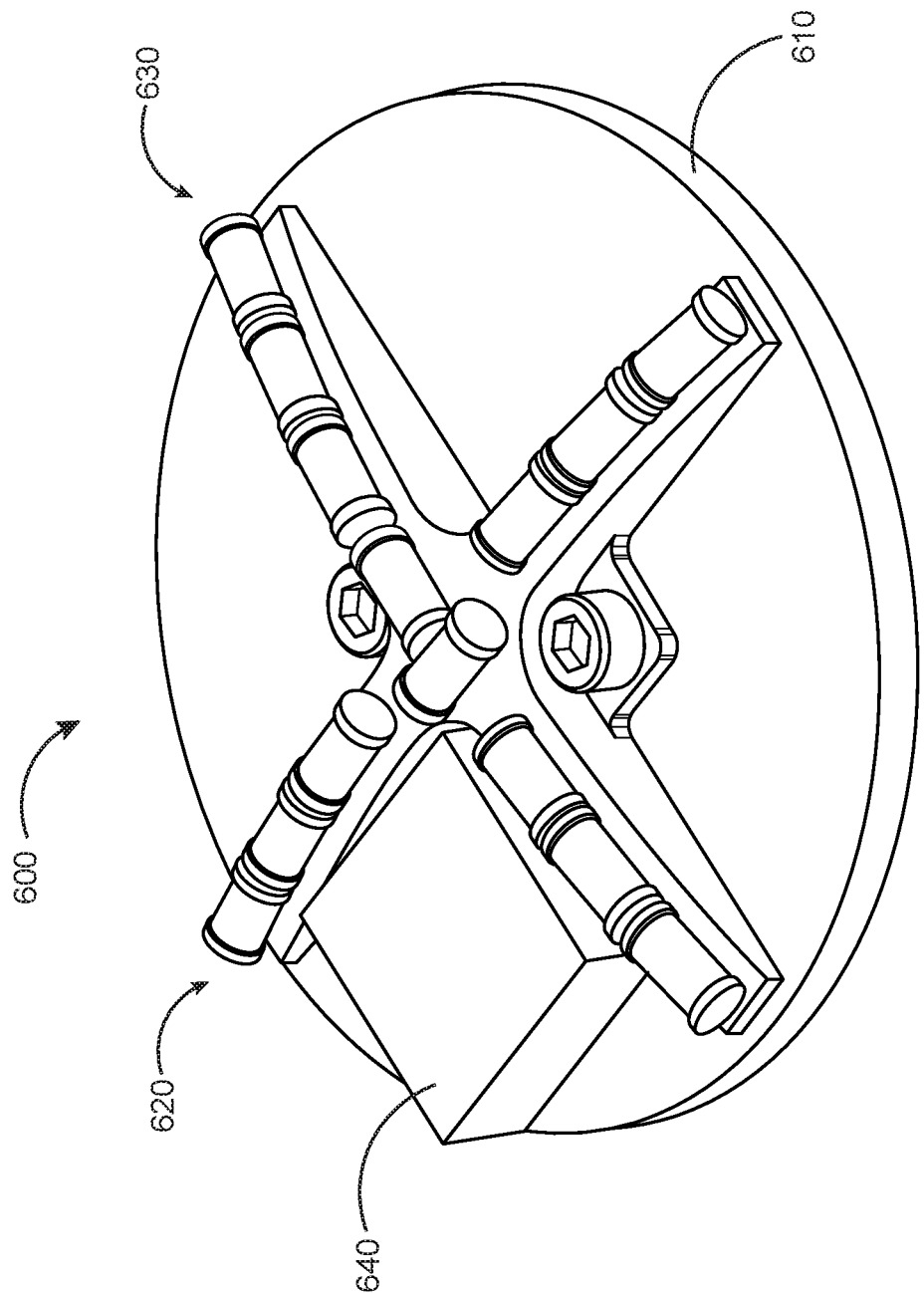
FIG. 6 illustrates a 2-axis MEMS tiltmeter array.
Figure 7:
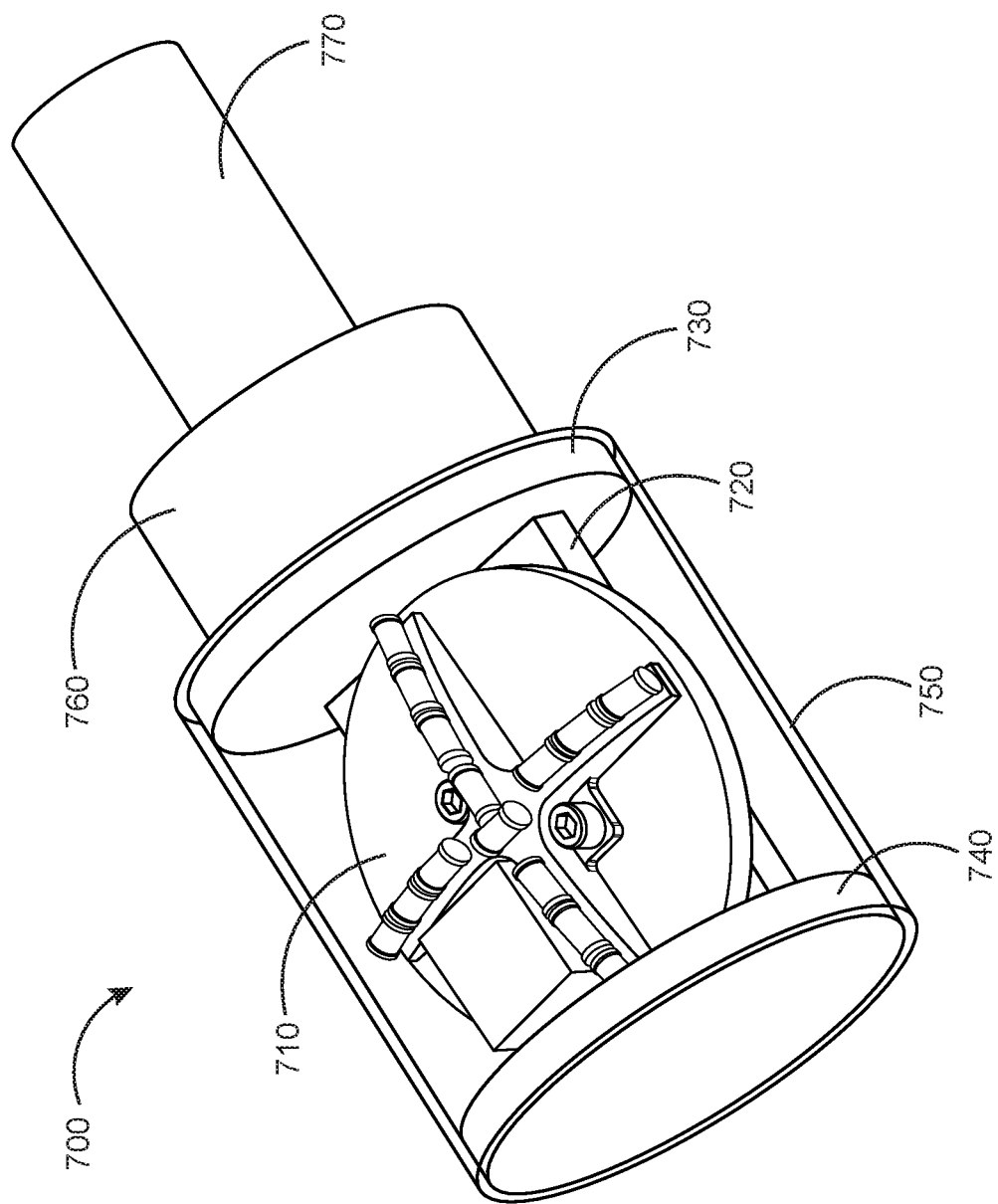
FIG. 7 illustrates a horizontal tilt mechanism.

FIG. 7, shown generally as 700, illustrates the tiltmeter array 710 of FIG. 6 mounted on a plate 720 that can be rotated by a servo motor 770 via a planetary gear 760. When the EAT tiltmeter assembly reaches its location in the horizontal section, the orientation of the sensor array is unknown. The EAT processor uses the coarse resolution tiltmeter in the tiltmeter chip to find horizontal quickly by rotating the mounting plate until the tiltmeter chip indicates that the sensor array is upright, or uses the high resolution sensors directly by noting which direction they need to move to enter their operating range. Then accurate readings using the tilt sensor array readings are made and transmitted to the surface using the EAT technology. The tilt mechanism is only used once at startup, while the tiltmeter array has sufficient range in X and Y axes to cover the entire microdeformation range. Not shown in these figures are the accompanying micro seismic sensors, which could be mounted on the same boards.

Figure 8:
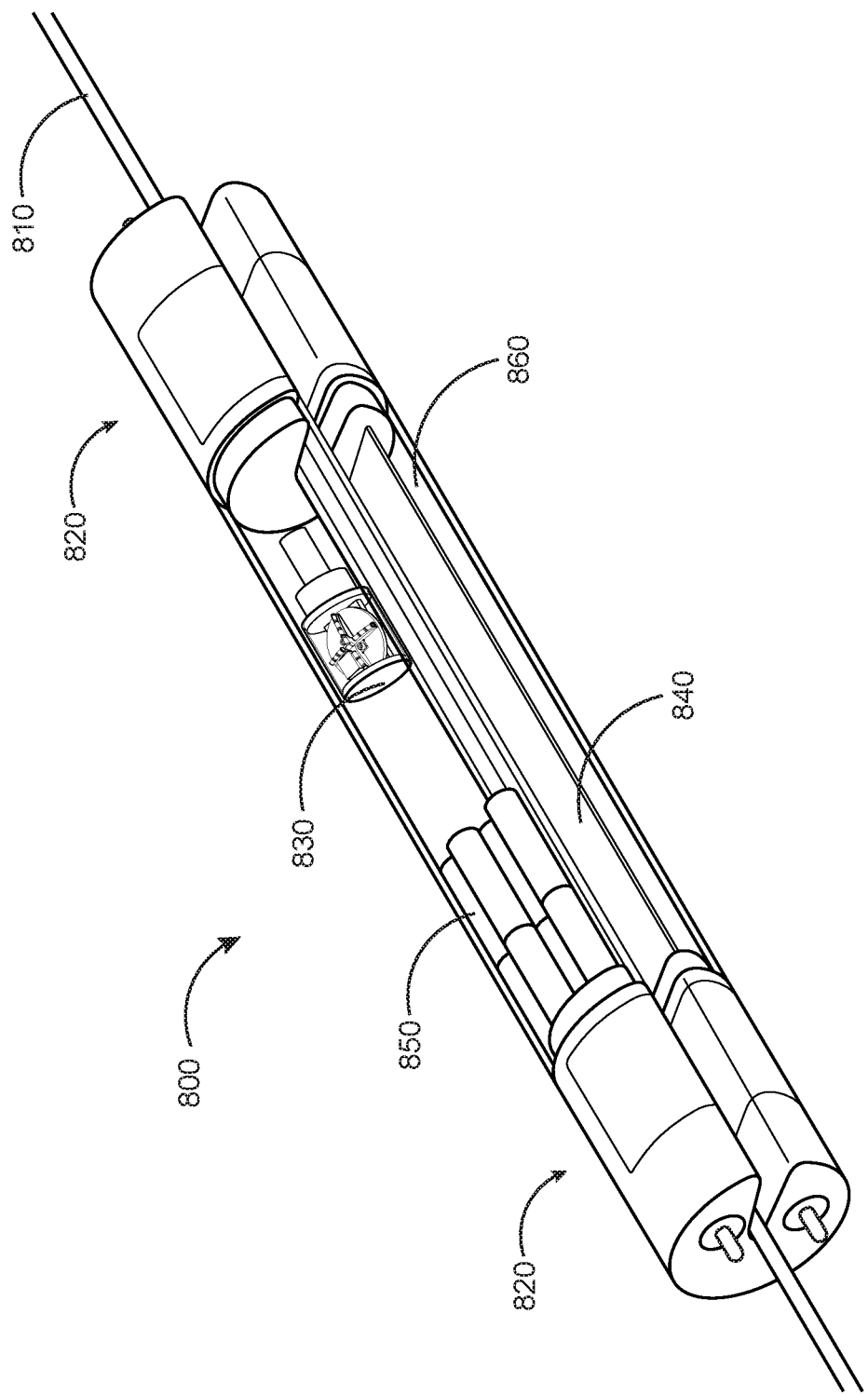
FIG. 8 illustrates a horizontal EAT tiltmeter assembly.

A complete horizontal EAT tiltmeter assembly is shown in FIG. 8, shown generally as 800. Illustrated is the EAT clamp on device shown previously in FIG. 5, in which the horizontal tiltmeter mechanism of FIG. 7 is now shown mounted as the numeral 830. The EAT clamp on assembly still consists of end clamps 820 for clamping onto wireline cable 810, batteries 850, a circuit board 840 comprising a power controller, processor, and A/D converter, and a surrounding housing 860.

Vertical EAT Tiltmeter Assembly

In some cases the EAT tiltmeter instrument may be designed to operate only in a near vertical orientation. For this, the horizontal EAT tiltmeter can be further simplified as shown in FIG. 9, shown generally as 900 by fixing the tilt meter array of FIG. 6, now shown as 920 in place and eliminating the servo motor and planetary gear of FIG. 7. The tiltmeter array has sufficient range so that finding a horizontal upright position is unnecessary. The tiltmeter chip can provide confirmation of the upright position. The EAT clamp on assembly is again mostly identical to those shown previously with end clamps 910, batteries 940, a circuit board 930 comprising a power controller, processor, and A/D converter, and a surrounding housing 950. Not shown in these figures are the accompanying micro seismic sensors, which could be mounted on the same boards.

Value Added

Instruments using electrolytic sensors are limited to the angle they can measure in a well, and require mechanical mechanisms to adjust for even a small range. By using MEMS based tiltmeters in arrays, a wide range in both axial and lateral measurement is possible, at high resolution, both in vertical and horizontal portions of the well. The horizontal measurement close to the fractured well is unique and will provide more accurate mapping and interpretation. By using multiple EAT sensors in the horizontal section, a much wider area of detection is possible when compared to vertical well detection.

The MEMS sensors are very small, rugged and low cost, and can be built up in arrays. The centering motor is only used once at the beginning of the run. The sensors use nano watts of power, so can be deployed for long periods without recharging.

The use of the tiltmeter array with EAT technology along with micro seismic sensors represents a significant reduction in size, complexity and cost compared to current tiltmeter designs. With fewer moving parts the tiltmeters are also more reliable.

Using DAS technology provides dual use for the fiber—both as a well monitoring system over its entire length, as well as providing point specific measurements of inclination. Providing both at the same time is a unique service.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. An electro acoustic technology (EAT) based tiltmeter system deployed in a tool well for detection of minute deformations in downhole formations caused by hydraulic fracturing or other sources of pore pressure changes in a hydraulically fractured well, comprising:
a wireline containing optical fiber installed from a well surface to a bottom of the tool well located in close proximity to the hydraulically fractured well bore;
a distributed acoustic sensing (DAS) interrogator located at the surface and connected to the optical fiber in the wireline for detecting and interpreting acoustic signals from the optical fiber based wireline cable; and
EAT sensor devices attached at selected intervals along the optical fiber based wireline cable, each of the EAT sensor devices comprising:
signal processing electronics,
batteries,
transmission transducers, and
a plurality of arrays of microelectromechanical systems (MEMS) tiltmeters mounted on circuit boards, wherein:
at least one array of the plurality arrays of tiltmeters sense in a lateral orientation relative to the EAT sensor device; and
at least one other array of the plurality of arrays of tiltmeters senses in an axial orientation relative to the EAT sensor device.

2. The EAT based tiltmeter system of claim 1, wherein a first tiltmeter of a first of the at least one array of tiltmeters that sense in the lateral orientation is mounted perpendicular to a respective circuit board for that array of tiltmeters and each subsequent tiltmeter is mounted at an angle of a previous tiltmeter minus a range of the tiltmeter until a last tiltmeter of a second array of the at least one array of the tiltmeters that sense in the lateral orientation is mounted planar to the respective circuit board for that array of tiltmeters.

3. The EAT based tiltmeter system of claim 2, wherein the first tiltmeter of the first of the at least one array of tiltmeters that sense in the lateral orientation relative to the EAT sensor device perpendicular to the respective circuit board is suitable for vertical sections of the tool well.

4. The EAT based tiltmeter system of claim 2, wherein the last tiltmeter of the second of the at least one array of tiltmeters that sense in the lateral orientation relative to the EAT sensor device planar to the respective circuit board is suitable for horizontal sections of the tool well.

5. The EAT based tiltmeter system of claim 2, wherein the range of each tiltmeter is +/−1 degree or +/−5 degrees.

6. The EAT based tiltmeter system of claim 1, wherein a first tiltmeter of the at least one other array of tiltmeters that senses in the axial orientation is mounted planar to a respective circuit board for that array and each subsequent tiltmeter is mounted at an angle of a previous tiltmeter plus a range of the tiltmeter until a last tiltmeter of the at least one other array of tiltmeters reaches a threshold.

7. The EAT based tiltmeter system of claim 6, wherein the range of each tiltmeter is +/−1 degree or +/−5 degrees.

8. The EAT based tiltmeter system of claim 6, wherein the threshold provides +/−50 degrees of range.

9. The EAT based tiltmeter system of claim 2 wherein the circuit boards are mounted on an assembly on a plate that can be rotated by a servomotor.

10. The EAT based tiltmeter system of claim 9, wherein the assembly is rotated by the servomotor for horizontal locations in the tool well so that the perpendicular tiltmeter is upright in the horizontal locations in the tool well.

11. The EAT based tiltmeter system of claim 1, wherein the plurality of arrays of tiltmeters measure a swell of subsurface strata due to poroelastic effects from altering fluid pressure in the subsurface strata.

12. The EAT based tiltmeter system of claim 1, further comprising surface tiltmeters.

13. An electro acoustic technology (EAT) based tiltmeter method for detection in a tool well of minute deformations in downhole formations by hydraulic fracturing or other sources of pore pressure changes in a hydraulically fracture well, the method comprising:
providing a wireline containing optical fiber installed from a well surface to a bottom of the tool well located in close proximity to the hydraulically fractured well bore;
providing a distributed acoustic sensing (DAS) interrogator located at the surface and connected to the optical fiber in the wireline for detecting and interpreting acoustic signals from the optical fiber based wireline cable; and
providing EAT sensor devices attached at selected intervals along the optical fiber based wireline cable, each of the EAT sensor devices comprising:
signal processing electronics,
batteries,
transmission transducers, and
a plurality of arrays of microelectromechanical systems (MEMS) tiltmeters mounted on circuit boards, wherein:
at least one array of the plurality arrays of tiltmeters sense in a lateral orientation relative to the EAT sensor device; and
at least one other array of the plurality of arrays of tiltmeters senses in an axial orientation relative to the EAT sensor device.

14. The EAT based tiltmeter method of claim 13, wherein a first tiltmeter of a first of the at least one array of tiltmeters that sense in the lateral orientation is mounted perpendicular to a respective circuit board for that array of tiltmeters and each subsequent tiltmeter is mounted at an angle of a previous tiltmeter minus a range of the tiltmeter until a last tiltmeter of a second array of the at least one array of the tiltmeters that sense in the lateral orientation is mounted planar to the respective circuit board for that array of tiltmeters.

15. The EAT based tiltmeter method of claim 14, wherein the first tiltmeter of the first of the at least one array of tiltmeters that sense in the lateral orientation relative to the EAT sensor device perpendicular to the respective circuit board is suitable for vertical sections of the tool well.

16. The EAT based tiltmeter method of claim 14, wherein the last tiltmeter of the second of the at least one array of tiltmeters that sense in the lateral orientation relative to the EAT sensor device planar to the respective circuit board is suitable for horizontal sections of the tool well.

17. The EAT based tiltmeter method of claim 14, wherein the range of each tiltmeter is +/−1 degree or +/−5 degrees.

18. The EAT based tiltmeter method of claim 13, wherein a first tiltmeter of the at least one other array of tiltmeters that senses in the axial orientation is mounted planar to a respective circuit board for that array and each subsequent tiltmeter is mounted at an angle of a previous tiltmeter plus a range of the tiltmeter until a last tiltmeter of the at least one other array of tiltmeters reaches a threshold.

19. The EAT based tiltmeter method of claim 18, wherein the range of each tiltmeter is +/−1 degree or +/−5 degrees.

20. The EAT based tiltmeter method of claim 18, wherein the threshold provides +/−50 degrees of range.

21. The EAT based tiltmeter method of claim 14 wherein the circuit boards are mounted on an assembly on a plate that can be rotated by a servomotor.

22. The EAT based tiltmeter method of claim 21, wherein the assembly is rotated by the servomotor for horizontal locations in the tool well so that the perpendicular tiltmeter is upright in the horizontal locations in the tool well.

23. The EAT based tiltmeter method of claim 13, wherein the plurality of arrays of tiltmeters measure a swell of subsurface strata due to poroelastic effects from altering fluid pressure in the subsurface strata.

24. The EAT based tiltmeter method of claim 13, further comprising surface tiltmeters.

* * * * *